Jan. 24, 1933.　　　O. A. CARLSON　　　1,895,093

ROLLER SKATE WHEEL

Filed July 16, 1930

INVENTOR
Oscar A. Carlson
BY Edwin Levisohn
ATTORNEY

Patented Jan. 24, 1933

1,895,093

UNITED STATES PATENT OFFICE

OSCAR A. CARLSON, OF WEST LAWN, PENNSYLVANIA, ASSIGNOR TO D. P. HARRIS MANUFACTURING CO., OF READING, PENNSYLVANIA

ROLLER SKATE WHEEL

Application filed July 16, 1930. Serial No. 468,334.

This invention relates to roller skate wheels and to a method of making the same.

In the past, ball bearing wheels for use upon skates and the like have been provided for effecting smooth rolling of the skate over a surface. Such wheels have had treads either of steel or wood, or even rubber. In the cases of the different materials the manufacture of the wheel required a great number of steps; the ball race and its accompanying elements required separate assembly, after which the portions for retaining the tread had to be assembled with the ball race before the tread itself could be applied. Steel wheels, for instance, were made up of a plurality of interlocked steel bands, the final product from which was a hard surfaced wheel having none of the softness and sound-muffling characteristics inherent in the use of rubber or like treaded wheels. The tread of such steel wheels could be but a few hundredths of an inch in thickness because of the weight, thus considerably reducing the life of the wheel.

Wood does not lend itself well to the production of a firm, reliable wheel which will stand up to the extreme shocks and wear to which such wheels are, in the general course of their use, subjected. Furthermore, the wood turning and accurate wood-working necessary to produce a wheel body which could be assembled with the ball races and retain such races accurately in position is both very costly and requires great skill.

Tread portions have been made of rubber. A strip thereof is clamped within a steel rim which itself is clamped upon, or otherwise secured to, the ball race of a wheel. Such wheels are undesirable in that the rubber tire or tread portion may separate from the rim with which it is assembled, whereupon the usefulness of the wheel is destroyed. The rubber tread may not have been tightly clamped within the steel rim when assembled, or, after use for a short time, the flanges holding the rubber tread may have become spread. In such case, the tire is free to move relatively to the rim; in fact there may be a total separation of tire and rim.

It is an object of this invention to provide a ball bearing wheel for skates, and for like purposes, having a tread portion formed permanently relatively to and upon the ball race so that thereafter relative movement of tread and race may not take place, these parts being securely anchored together against any such movement. Furthermore, a material is used for such tread so that the resultant body has many of the properties of a silent rubber tread, while retaining many of the properties of a strong steel wheel in which the tread is immovably positioned, or substantially so, relatively to the ball race.

It is an object of this invention to construct a wheel of the type hereinabove set forth in which bakelite, or some similar moldable condensation product which is easily molded, preferably under pressure, forms the bulk or all of the wheel body or tread. A material is intended which, while producing a wheel of great hardness and density has properties which, in a wheel, are inimical to the production of noise when the tread travels over a surface, that is, a property of elasticity similar to that of rubber. It is to be understood that the use of rubber itself is not excluded from application for the purposes of this invention; it is in fact contemplated that a wheel might be made in which a mass of rubber would be molded about the ball race in the same manner as bakelite or like material, or in which an initial portion of rubber, first molded to conform to one portion of the race, is subsequently vulcanized to another portion of rubber, the race being retained between the two rubber portions so that a substantially integral member is produced.

In the use of materials such as bakelite or the like, the property of these materials, in liquid condition, to flow through small crevices must be counteracted. It has, however, been found, that in flowing through such small crevices the liquid material does not have the added property of flowing around sharp corners in such crevices. Since it is contemplated to make the ball race of two distinct members between which the ball bearings would be arranged, a suitable means is provided at the junction edges of the two members to bind them rigidly together and, under molding pressure, to prevent the passage of any material through the crevices to the interior of the ball race and thereby to guard against the presence of undesirable foreign matter within the ball race.

Other objects of this invention will be apparent from the description of the apparatus, and from the drawing herewith, or will be specifically pointed out herein.

The invention is not intended to be restricted to the details of construction and arrangement of parts herein shown and described, nor to the precise manner of carrying out the method, as the same may be modified in various particulars without departing from the spirit and scope of the invention, some practical embodiments of which have been herein illustrated and described without attempting to show all the various forms and modifications in which the invention might be embodied.

On the drawing, in which is disclosed some of the preferred embodiments of apparatus for effecting, and articles embodying, the invention.

Figure 1:
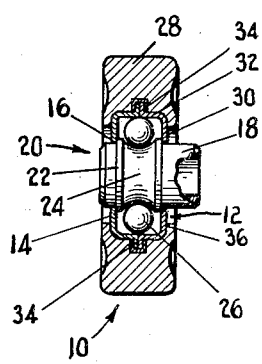
Fig. 1 is a diametrical sectional view of a ball bearing wheel formed in accordance with the invention.

In the manufacture of ball bearing wheels for roller skates, such as the wheel 10, shown in Fig. 1, it has become increasingly important to provide for the wheel a tread which will have resilient characteristics, that is, which will have a cushioning effect when it rolls over a surface so as to reduce the noise arising from contact of the roller with such surface.

For this purpose, it is desired to form the tread for a wheel of this character of some moldable material, such as bakelite or rubber, either hard or in a condition commercially known as crepe rubber. The manner of applying a tread of this character to a wheel used as indicated forms a part of the invention. The specification concerns itself, in part, with the formation of a wheel having a tread of bakelite or similarly moldable condensation product, while another portion of the specification has relation to the manufacture of a wheel with a tread of rubber or similar material which responds to the reactions of vulcanization or the like.

A wheel 10 of the type intended consists essentially of a ball race 12, which is formed, in the instance under consideration, of a pair of dished members 14, which are mated so that the dished surfaces extend away from the common line of contact which is at, or adjacent to, the edges of the members. Openings 16 are formed centrally of, and extend through the members so that the body 18 of an axle 20 may be inserted therethrough and assembled in position relative to said members. The axle is preferably hollow so that other portions of the skate, or the like, with which it is intended to be assembled, may simply and easily be retained therewith. The bodies of members 14 at the openings therein are intended to abut collars 22, preferably formed integrally with body 18 of the axle. A concaved surface 24 is formed between the collars so that, together with the concaved inner surfaces of members 14 at the dished out portions thereof, a race for ball bearings 26 is provided. The tread 28 of the wheel must be formed or otherwise provided exteriorly of these parts so far set forth, and must be retained fixedly in relation to the members 14 which are intended to rotate about the fixed axle 20, between which and members 14 the balls 26 provide an anti-friction means.

Figure 7:
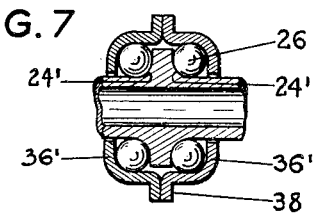
Fig. 7 is a sectional view similar to the corresponding portions shown in Fig. 1 and Fig. 2, but showing a modification wherein a plurality of race ways are provided.

It will be understood, of course, by reference to Fig. 7, that a plurality of race ways may be provided within the mated members 36'. And it is intended that wherever the term, ball race, or similar term is employed, that a plurality of ball races or race ways are also referred to without specific reference to such plurality. Referring to Fig. 7, the primed numbers correspond to similar non-primed parts referred to in other views.

In molding a wheel of the character above set forth in which materials of the character of bakelite or the like are utilized in forming the tread portion of the ball race, with which the moldable compound is pressed into contact, it must be made of sufficient strength to withstand the great pressures which are necessarily utilized for the successful molding of the compound about these portions of the wheel. For this purpose, therefore, the members 14 are formed of sufficient thickness; dishing the members adds to their strength, especially as it will appear at those parts which will have to suffer the greatest compression during the molding operation.

In the modification of Fig. 1, the members 14 are shown to consist substantially of a series of right angular bent portions, as at the junction of the intermediate body portion 30 thereof with the flange 32, as well as at the junction of the flange 32 with the edge 34. The members thus are dished to increase their strength while being also formed to provide the desired concavity within the members which, together with the surface 24, acts as a ball race for ball bearings. The balls, as shown, have but slight surface contact with the inner surface of the member, thus reducing the possible friction with the loss of surface of contact.

Figure 2:
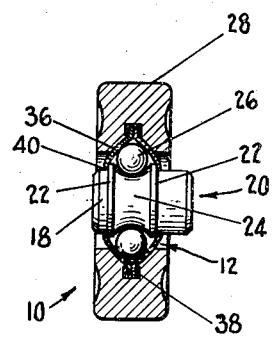
Fig. 2 is a view similar to Fig. 1 of a modified form of ball bearing wheel formed in accordance with the invention.

In Fig. 2 is shown a modification in the construction of the ball race as formed by the dished members. In the modified structure, a pair of mated members 36 are utilized. Members 36, except for the edge portions 38 which are flat to provide a basic surface of contact for each of the members in their assembly, are substantially spherical in their contour, or at least follow a uniform curved gradation in their contour so that a uniformly dished surface is formed. Thus a surface having great resistance to collapse under pressure such as is met with in the molding operations hereinafter set forth and applied to the exterior of the shells is erected. Openings 40 similar to the openings 16 are provided in members 36 for similar purposes.

Figure 3:
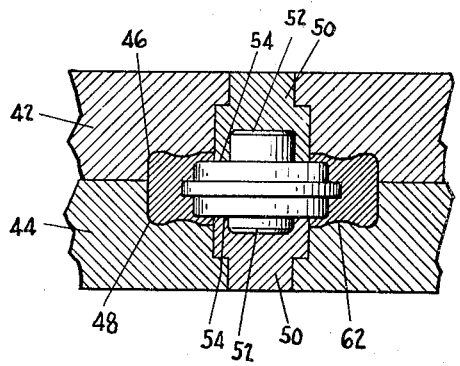
Fig. 3 is a vertical sectional view of a portion of a mold used in the manufacture of wheels such as are shown in Figures 1 and 2, and in which the invention has been embodied.

In molding either one of these forms of wheels, a mold similar to that illustrated in Fig. 3 may be utilized. In such mold, the two halves 42 and 44 are formed with cut-outs 46 and 48, conforming generally to the desired contour of the body of the tread to be molded. Through the body of each of the halves and so that it extends into the respective cut-out is anchored a plug 50, a depression 52 in the face of which is intended to be seated over the axle and the body portion of the dished members to support them and to guard them against the entry therewithin of the material used in molding the tread. The face portions 54 of the plugs are intended to abut directly against the body portions of the dished members, whereby the assemblage of the dished members and the axle is retained rigidly in position during the operation of molding the tread.

Figures 5, 6:
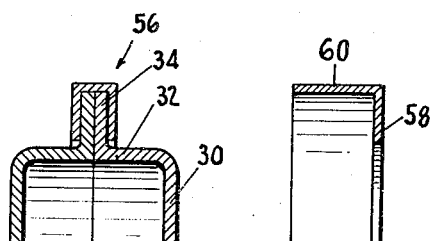
Fig. 5 is a fragmentary detail sectional view of a portion of a ball race, illustrating the assembly therewith of sealing means used to effect the invention.
Fig. 6 is a fragmentary detail view of a portion of the sealing ring, before its application to the ball race of Fig. 5.

The edges 34 of the dished members are preferably substantially flat on the inner surfaces thereof in order that, when the two members are abutted for purposes of assembly, a substantially tightly sealed joint is produced between them, through which normally pasty fluids will be unable to pass. However, bakelite and similar substances are molded at high temperatures such that the material is in a high stage of fluidity and probably would flow between the abutted surfaces, in spite of the pressure which might be applied by the plugs 50. In order to avoid any such contingency, and the consequent fouling of the ball race by the material thus introduced thereinto, a sealing ring 56 having an internal diameter substantially that of the outside of the edges 34 is fitted upon and over the slit formed between the abutted edges. The ring, preferably of sheet steel of very thin gauge, or of similar material, may be made up as shown in Fig. 6, in which instance it is seen to consist of an annulus 58 having an outwardly extending flange 60. The ring is positioned, in the assembly operation, with the annulus in abutment with the flange of one of the dished members; the flange 60 is then worked down around the flange of the other member so that the two members are clamped together and the slot between the two edges sealed closed.

The assemblage thus produced is then positioned in a mold such as described above and as shown in Fig. 3, and the molding material is inserted within the cut-outs of the mold. The halves of the mold are forced together so that the material in the cutouts will be compressed about the dished members and against the side of the mold and the restraining plugs, but will not pass to the faces of the dished members adjacent to, or to the axle itself. The plugs, during such operation, support the dished members against the pressure applied for the molding operation; the members, because of their construction above recited, being of sufficient strength to prevent the occurrence of any damage while thus supported.

The cut-outs of the mold may be formed in any desired fashion to give a wheel of pleasing contour, such as shown on the drawing, in which the depressed surface 62 has been formed in the wheel tread, in which case a reduction in the amount of the material used has, in no manner, reduced the strength of the wheel.

Figure 4:
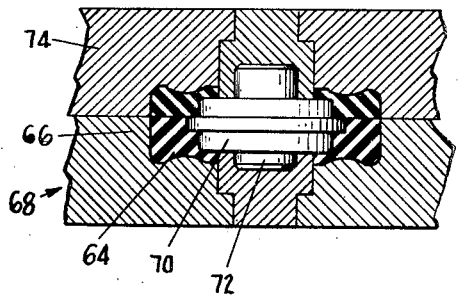
Fig. 4 is a view similar to Fig. 3 illustrating a modified method of producing a further modified form of wheel which embodies the invention.

In Fig. 4 is shown a method in accordance with the invention which is particularly applicable to the manufacture of wheels with rubber treads. In this method, a rubber piece 64 is first molded to conform to the shaping of the ball race on one side and to the predetermined contour of the wheel on the other side. The piece is then placed in the section 66 of the mold 68, after which the ball race 70 and its assembled axle 72 are positioned in piece 64 and supported within the mold. Some moldable and vulcanizable rubber is placed in the other section 74 of the mold which is formed similarly to the halves 42 and 44 of Fig. 3, the sections brought together and the rubber portions, by suitable pressure and heat, vulcanized together to provide a substantially one-piece rubber wheel. Instead of plastic rubber in the above operation, it is to be understood that another completely formed rubber piece may be assembled with piece 64 and the ball race and axle, after which the vulcanization of the two pieces may be effected.

As many changes could be made in the construction and process herein involved, and many widely different embodiments of the invention designed without departing from the scope of the invention, as defined in the accompanying claims, the matter set forth by the above description is intended to be interpreted merely as illustrative of operative embodiments of the invention.

I claim:

1. As an article of manufacture, an axle, a pair of mated abutted shells cooperating with said axle to form a ball race therebetween, each of said shells having substantially rounded surfaces except at the points of mating thereof, a sealing ring at the abutted edges of said shells, and a one-piece tread molded on said shells around said sealed edges and retaining said shells in permanently associated relation.

2. As an article of manufacture, an axle, a pair of mated abutted shells cooperating with said axle to form a ball race therebetween, each of said shells having substantially rounded surfaces, a sealing ring at the abutted edges of said shells, and a one-piece tread molded on said shells around said sealed edges and retaining said shells in permanently associated relation.

3. As an article of manufacture, an axle, a pair of mated abutted shells cooperating with said axle to form a ball race therebetween, each of said shells having an externally convexed surface, a sealing ring at the abutted edges of said shells, and a one-piece tread molded on said shells around said sealed edges and retaining said shells in permanently associated relation.

4. As an article of manufacture, an axle, a pair of mated abutted shells cooperating with said axle to form a ball race therebetween, a sealing ring at the abutted edges of said shells, and a one-piece tread molded on said shells around said sealed edges and retaining said shells in permanently associated relation.

5. As an article of manufacture, a pair of mated abutted shells formed to provide a ball race therebetween, a sealing ring at the abutted edges of said shells, and a one-piece tread molded on said shells around said sealed edges and retaining said shells in permanently associated relation.

6. As an article of manufacture, an axle, a pair of mated abutted shells cooperating with said axle to form a ball race therebetween, a sealing ring at the abutted edges of said shells, and a tread molded on said shells around said sealed edges and retaining said shells in permanently associated relation.

7. As an article of manufacture, an axle, a pair of mated abutted shells cooperating with said axle to form a ball race therebetween, a sealing ring at the abutted edges of said shells, and a tread molded on said shells and retaining said shells in permanently associated relation.

8. The process of manufacturing roller wheels which comprises: assembling a plurality of ball bearings between a pair of mated plates and an axle with which said plates are associated, sealing the mated edges of said plates, supporting the assembled sealed plates, and positioning about said plates a moldable material which, when in moldable condition, is substantially fluid, and applying pressure to the material, while the supported plates are guarded against ingress of said material within said plates or to said axle.

9. The process of manufacturing roller wheels which comprises: assembling a plurality of ball bearings between a pair of mated plates and an axle with which said plates are associated, sealing the mated edges of said plates, supporting the assembled sealed plates, and positioning about said plates a moldable material which, when in moldable condition, is substantially fluid, and applying pressure to the material.

10. The process of manufacturing roller wheels which comprises: positioning a ball race and axle in a mold so that a face of the race is protected by a wall of the mold, introducing into the mold, and surrounding the ball race except at said axle, with material which, upon the application of pressure, will solidify and become substantially homogeneous throughout, and applying pressure to said material while protecting the other face of said race against movement of said material thereinto and to said axle.

11. The process of manufacturing roller wheels which comprises: assembling a plurality of ball bearings between a pair of mated plates and an axle with which said plates are associated, sealing the mated edges of said plates, and forming about said plates a tread of a moldable material which, when in moldable condition, is substantially fluid.

12. As an article of manufacture, a wheel including an axle, a pair of mated shells assembled on the axle and forming therewith a ball race, said shells having end faces thereof brought into face to face relationship to provide a circumferential ridge, and a tread for the wheel molded upon the shells and immediately over the ridge.

13. As an article of manufacture, a wheel including an axle, a pair of mated shells assembled on the axle and forming therewith a ball race, said shells being formed with peripheral flanges, the flanges being brought into face to face relationship to provide a circumferential ridge, and a tread for the wheel molded upon the shells and immediately over the ridge.

14. As an article of manufacture, a wheel including an axle, a pair of mated shells assembled on the axle and forming therewith a ball race, said shells being formed with peripheral flanges, the flanges being brought into face to face relationship to provide a circumferential ridge, and a tread for the wheel retained upon the shells and immediately over the ridge.

15. As an article of manufacture, a wheel including an axle, a pair of mated shells assembled on the axle and forming therewith a ball race, said shells being formed with peripheral flanges, the flanges being brought into face to face relationship to provide a circumferential ridge, an annular member encompassing the ridge, and a tread for the wheel retained upon the shells and immediately over the member.

16. A process of manufacturing roller wheels which includes the steps of: positioning in a mold a ball race made up of a pair of shells abutted at their peripheries, and encompassing the shells over the abutted portions thereof and beyond the abutted peripheral walls of the shells with a unitary mass of moldable material, substantially, as described.

17. As an article of manufacture, a roller wheel including an axle, a pair of shells assembled upon the axle and with it forming a ball race, said shells having dished portions and peripheral portions, the shells being positioned in cooperating, contacting relationship, and a tread for the wheel molded and engaged over the peripheral portions of the shells and dished portions adjacent the peripheral portions, whereby the tread will be retained against lateral displacement relative to the ball race.

18. As an article of manufacture, a roller wheel including an axle, a pair of shells assembled on and providing a pair of walls extending away from the axle, the shells and the axle forming therewith a ball race, the shells having portions brought into cooperating relationship and forming a peripheral wall, and a tread for the wheel molded over the shells and engaged over the peripheral wall.

19. As an article of manufacture, a wheel including an axle, a pair of shells assembled on and providing a pair of walls extending away from the axle, the shells and the axle forming therewith a ball race, the shells having portions brought into cooperating relationship and forming a peripheral wall, and a tread for the wheel molded over the shells and engaged over the peripheral wall and a portion of the walls extending away from the axle.

20. A process of manufacturing roller wheels which includes the steps of positioning in a mold a pair of associated ball race forming shells, the shells being constructed to dispose a peripheral extension in the mold, and encompassing the peripheral extension and adjacent portions of the shells with a unitary mass of moldable material, substantially as described.

21. As an article of manufacture, a ball-bearing wheel having a tread integrally united therewith and retaining the several parts of the wheel permanently associated, comprising an axle for the wheel, a plurality of metallic shells, the shells and axle being constructed so that, when the shells are mounted on the axle, they define with the axle a ball race for ball bearings for the wheel, the shells being dished for the retention of the balls and having portions thereof brought into abutting relation, and a tread for the wheel molded directly upon the shells and over the abutted portions and retaining the shells against separation.

In testimony whereof he has affixed his signature.

OSCAR A. CARLSON.